United States Patent [19]

Spremulli

[11] 4,029,887
[45] June 14, 1977

[54] ELECTRICALLY HEATED OUTLET SYSTEM

[75] Inventor: Paul F. Spremulli, Corning, N.Y.

[73] Assignee: Corning Glass Works, Corning, N.Y.

[22] Filed: Apr. 27, 1976

[21] Appl. No.: 680,728

[52] U.S. Cl. .................................. 13/6; 13/33; 65/326

[51] Int. Cl.² ...................... C03B 5/02; C03B 5/30

[58] Field of Search ............... 13/6, 23, 33; 65/325, 65/326, 347

[56] References Cited

UNITED STATES PATENTS

| | | | |
|---|---|---|---|
| 2,594,972 | 4/1952 | Muehlenkamp | 13/6 |
| 2,902,524 | 9/1959 | Paxton | 13/6 |
| 2,984,829 | 5/1961 | Augsburger | 13/6 X |
| 3,160,692 | 12/1964 | Paxton | 13/6 |
| 3,328,153 | 6/1967 | Augsburger | 13/6 X |
| 3,580,976 | 5/1971 | De Bussy | 65/326 X |
| 3,725,558 | 4/1973 | t'Serstevens | 13/6 |
| 3,742,111 | 6/1973 | Pieper | 13/6 |
| 3,757,020 | 9/1973 | Steitz et al. | 13/6 |

*Primary Examiner*—R. N. Envall, Jr.
*Attorney, Agent, or Firm*—Burton R. Turner; Clarence R. Patty, Jr.

[57] ABSTRACT

An apparatus for heating glass-forming materials within a delivery conduit extending from an electric glass melting furnace to a connector channel is disclosed. The conduit is made from an electrically conductive refractory metal such as molybdenum and is used to conduct current from inside the furnace to its exit end in the channel. Joule effect heating between the exit end of the conduit and an electrode in the connector channel indirectly causes the glass materials within the conduit to partially melt, to the extent that the materials within the conduit may be exhausted from the conduit. A flange assembly for use with a molybdenum conduit is also disclosed.

13 Claims, 2 Drawing Figures

ELECTRICALLY HEATED OUTLET SYSTEM

BACKGROUND OF THE INVENTION

The present invention generally relates to an outlet system communicating between a furnace for melting thermoplastic material and a channel for receiving molten material from the furnace, and more particularly pertains to an outlet system connecting a furnace to a channel means, wherein an electrically conductive refractory conduit is used in conjunction with electrodes in the furnace and channel to supply heat to melt materials near the exit end of the conduit and with the conduit.

Vertically oriented electric glass melting furnaces have been known in the prior art for some time, but it has been only in the last several years that such furnaces have been brought into large scale commercial application. In the more recently developed furnaces, such as the type illustrated in U.S. Pat. Nos. 2,993,079, 3,524,206, 3,583,861, 3,725,558, 3,742,111, and 3,942,968, glass-forming batch materials are fed to the upper end of a vertical chamber and refined molten glass is withdrawn from the bottom of the chamber. High quality glass is thus produced in a single vertical chamber, with melting occuring in an upper portion thereof and preferably some refining occurring in the bottom portion.

The molten glass withdrawn from the electric furnace is received within a laterally extending connector channel situated at the side of the furnace bottom and thereafter is usually directed through a vertical passageway or riser to a mixing chamber and/or a forehearth. For example, in U.S. Pat. No. 3,942,968 to Pieper, the molten glass is withdrawn laterally from the furnace through a connector channel, thereafter is directed through a riser portion where coloring materials may be added, from the riser to a downwardly extending mixing chamber, laterally from the chamber through a second connector channel, then upwardly through a second riser, and finally to a forehearth or feeder. In the Pieper system, the delivery passageway extending from the furnace bottom is formed in refractory block material of the contiguous walls of the furnace and riser, and an electrode is positioned in the passageway. It will be appreciated by those skilled in the art of melting glass that the passageway electrode may not be used when cold glass-forming or batch material surrounds the electrode because the cold material will not be electrically conductive.

In other electric glass-melting furnaces heretofore employed, a refractory metal delivery conduit extends from near the center of the bottom of the furnace to the confines or passageway of the connector channel. The conduit is either placed on the furnace bottom wall or is laid into a trough incorporated in the furnace bottom wall; and the conduit is protected from exposure to solid or liquid contaminants, which originate in the batch and sink through the molten glass, by a cover of refractory blocks. The outlet system of such type of prior art furnace is provided with devices for heating the cold glass-forming material initially within the conduit; because, during the start-up or beginning stages of operation of the furnace, the heat conducted through the conduit from the molten glass in the furnace and connector channel and through the glass-forming or batch materials is not sufficient to melt all the cold batch material initially within the conduit. As used hereinafter, a cold plug is a quantity of batch material or solidified glass which is located within the conduit at a position therein at least generally coterminous with the furnace sidewall portion through which the conduit extends. The cold plug initially obstructs the flow of molten glass from the furnace to the connector.

The devices for heating the cold plug used in the prior known furnaces comprise a first coil-type electric resistance heating element which surrounds the portion of the conduit contained in the furnace sidewall, and a second strip-type electric resistance heating element located at the bottom of passageway of the channel near the exit end of the conduit. These heating devices are very expensive because the strip heater and the parts of the coil heater are made from platinum or a platinum rhodium alloy. Also, the prior art resistance heaters are difficult to install and repair and relatively slow in operation.

The primary object of the present invention is to provide an apparatus for melting a cold plug of batch materials or solidifed glass within an outlet conduit which does not require either a coil heater surrounding the conduit or a strip heater in the connector channel, which rapidly melts the cold plug, and which is easy to install and repair.

SUMMARY OF THE INVENTION

In accomplishing this object, a glass-melting furnace is provided with an outlet or delivery conduit made from a refractory metal which is electrically conductive, such as molybdenum. The conduit extends from the bottom of the furnace through the sidewall thereof and into a channel means adjacent the furnace sidewall for receiving the molten glass withdrawn through the conduit. The furnace has at least one electrode positioned relative to the inlet end of the conduit and the channel means includes at least one electrode positioned relative to the exit end of the conduit such that, upon application of voltage between the electrodes, electric current paths or flux will be established from the furnace electrode to at least the inlet end of the conduit, through the conduit, and from the conduit exit end to the connector electrode. The electric currents generated in the channel means will through the Joule effect cause heating of the glass in the channel at the exit end of the conduit; and the cold plug of glass materials in the conduit will be at least partially melted by heat transferred from the thus heated glass, to the extent such cold plug of materials may be exhausted from the conduit.

Preferably, a flange is connected to the conduit at the interface of the furnace and the channel means. When molybdenum is chosen for making the delivery conduit and the flange, such material must be protected from oxidation. Accordingly, a preferred embodiment of the present invention provides an assembly for protecting the conduit and flange from oxygen containing gases including two refractory blocks of a composite ring or washer-like forms which are positioned adjacent each side of the flange; and an annular metal shell or collar which partially envelopes these blocks. Cooling means attached to the circumference of the shell removes heat from the parts of the protection assembly and hence causes the glass seeping between the flange, blocks, and shell to solidify and form seals. Preferably, layers or sheets of insulating material are interposed between the sides of the shell and the adjacent furnace and channel refractory blocks to prevent leakage around the shell and to facilitate disassembly of outlet system.

BRIEF DESCRIPTION OF THE DRAWINGS

The aforenoted object, along with the advantages and important aspects of this invention, may be better understood by the following detailed description of a preferred form of the apparatus, taken in conjunction with the accompanying drawings in which.

DESCRIPTION OF THE PREFERRED EMBODIMENTS

Figure 1:
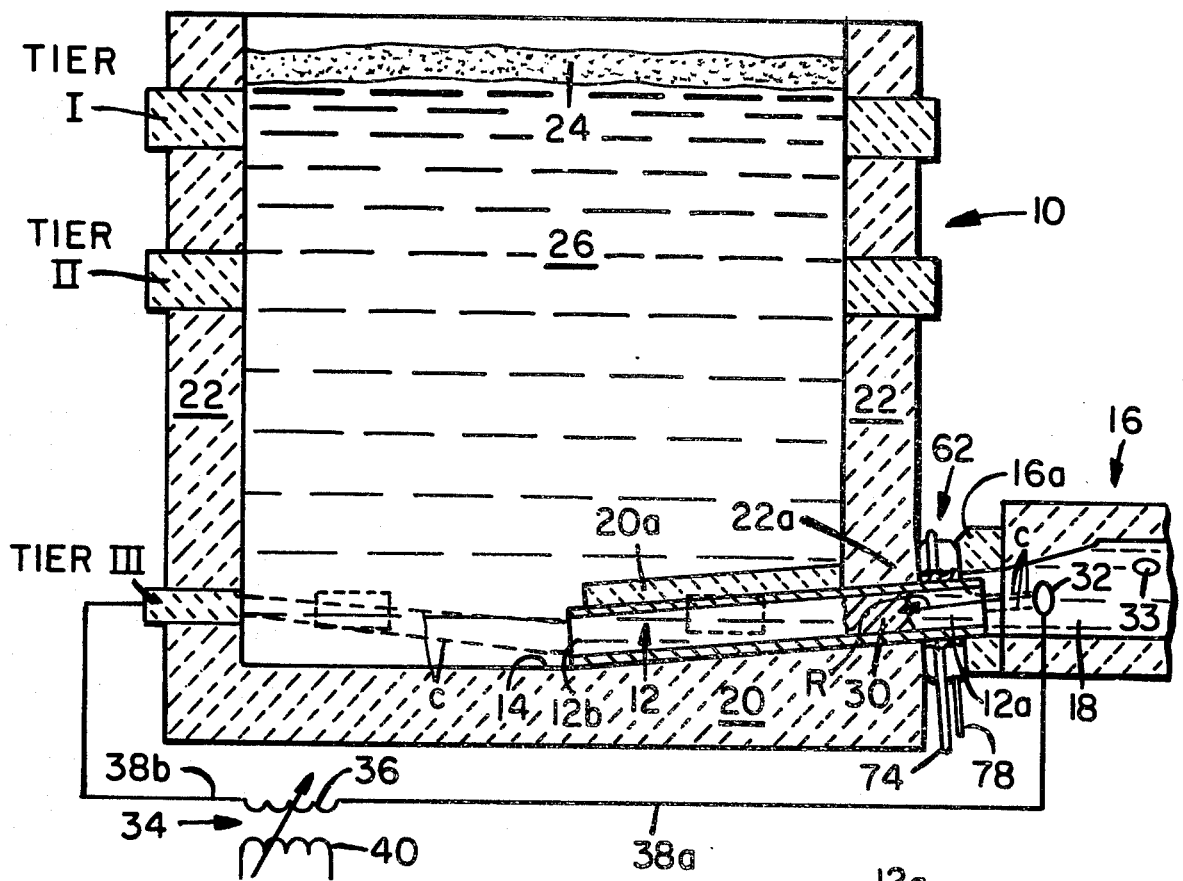
FIG. 1 is a cross-sectional elevational view of the new and improved furnace outlet system of this invention.

Referring to FIG. 1, there is provided a vertically oriented electric furnace 10 for melting thermoplastic material, such as glass, having an outlet or delivery conduit 12 laterally extending though the sidewall of the furnace, preferably from a bottom-center portion 14 thereof, to a position within a passageway 18 formed in a connector channel 16 for receiving glass withdrawn from the furnace through the conduit. The electric furnace 10 may be of the type disclosed in the aforecited U.S. Pat. Nos. 3,853,861 to Preston, 3,524,206 to Boettner et al. or 3,742,111 and 3,942,968 to Pieper, although it is not intended the invention be limited to the furnaces provided by these patents. The furnace comprises a vertical tank or chamber having a bottom wall 20 and an upstanding peripheral wall or sidewall 22 which is preferably symmetrical about a centerline; the bottom and peripheral walls are made of conventional refractory materials. The tank sidewall 22 may have a horizontal cross-sectional shape or profile, such as, a twelve sided polygon. Substructure which supports the furnace 10 and the connector channel 16 is not illustrated for the sake of clarity.

Batch is fed into the furnaces by a not-illustrated batch feeder and the batch forms a cover 24 which preferably essentially completely blankets the bath 26 of molten glass. During operation, i.e. after start-up, batch is fed continuously to the furnace and is continuously withdrawn through the outlet conduit 12 into the channel 16. Joule effect heat is supplied to the molten glass by means of alternating electric current introduced by a plurality of electrodes. As illustrated in the aforecited patents, the electrodes may be arranged in two or more planes; and the electrodes may extend through the sidewall 22 of the furnace. The electrodes may be rod-type and extend into the bath 26, or they may have inner ends which are flush with the inner surface of sidewall 22.

For example, two tiers of electrodes, I and II, may be provided in an upper melting portion of the furnace, and six or more electrodes may be disposed in each respective tier. The tier I electrodes may be connected to a three phase power source (not shown) to create current paths between diametrically opposed electrodes, i.e. cross-firing paths; and the tier II electrodes may be connected to the same or a separate three phase power source to create peripheral firing, that is, current paths between adjacent electrodes in the tier. Other electrode arrangements and connections to power sources are disclosed in the aforecited patents and also in U.S. Pat. No. 3,852,509 to Rutledge et al. and No. 3,725,558 to t'Serstevens.

A lowermost tier of electrodes III, shown in solid and dashed lines in the drawings, has been used in some of the aforecited prior art furnaces during "start-up" procedures. Typically, unmelted batch material is supplied to the bottom of the tank and conventional burners heat the batch to form a molten bath. After a molten bath is formed at the tank bottom, the tier III electrodes are electrically powered to melt more batch material until the tier II and thereafter tier I electrodes can be brought into operation. During operation after start-up, the lowermost electrodes in tier III may be turned off. It should be noted at this point that the electrode or electrodes utilized to heat the glass-forming materials in the outlet conduit 12, as will be described below, may be situated at any location in the bath 26. Such electrode or electrodes may extend through the bottom wall 20 as well as the sidewall 22; and such electrode device could also extend through the batch cover 24 and be removable after use during the start-up procedure.

As previously mentioned, in the prior known furnaces the delivery conduit 12 preferably extends from near the center of the bottom wall through a passageway or opening sidewall block 22a and into a horizontal passageway 18 in the connector channel 16. The horizontal passageway 18 may communicate with either a vertical passageway or riser or directly with a forehearth. In the prior known furnaces platinum or platinum-based alloys have been used to form the delivery conduit, which, of course, is extremely expensive, insofar as a typical delivery conduit is from 8 to 10 feet long. To protect the conduit, the bottom wall refractory block construction incorporates a trough on an upper surface thereof and cover blocks 20a are assembled over the conduit. To cause gases to flow from the outlet conduit, the conduit is inclined upwardly as it extends from near the center of the bottom wall.

Before start-up, the delivery conduit 12 is filled or packed with batch material or pieces of glass, popularly known as cullet. Due to the radiative and convective heat losses through the sidewall block 22a immediately surrounding the conduit, the batch material in the conduit located coterminous with the inner and outer surfaces of the side wall block 22a, or somewhat into the furnace sidewall block 22a and into the entrance block 16a of the connector, forms a cold plug 30 which is difficult to even partially melt. As previously mentioned, in the prior known electric furnace outlet systems, the cold plug 30 was partially melted by a resistance heating coil which was interposed between the conduit 12 and the sidewall block 22a around the cold plug 30; and by a platinum resistance heating strip situated in the connector passageway 18 adjacent the exit 12a to the delivery conduit.

The present invention dispenses with the need for a coil heater surrounding the cold plug and a strip heater in the connector passageway. In lieu thereof, the present outlet system takes advantage of any electrode or electrodes in the furnace but preferably one electrode of the lowermost, tier III electrodes within the melting furnace 10; the electrical conductivity of the outlet conduit 12; and at least one electrode 32 within the connector channel passageway 18, which connector electrode 32 may also be used to heat the glass in the connector passageway. Stated briefly, it utilizes what may be existing equipment to heat the cold plug enough to start flowing through the outlet conduit.

More specifically, the connector channel 16 has an electrode 32 which extends into the passageway 18 thereof and is located therein at a selected distance from exit end 12a of the outlet conduit 12. The electrode 32 is preferably positioned relative to the exit 12a to permit an unmelted portion of the cold plug 30, after is has been freed by partial melting, to at least fully emerge from the exit end 12a, for example, approximately one foot away from the exit 12a. The connector electrode 32 is connected to a lead 38a from the secondary coil 36 of a preferably variable transformer 34; and another secondary lead 38b is connected to at least one furnace electrode, such as one of the lowermost electrodes in tier III of the furnace 10, as illustrated in FIG. 1. The primary coil 40 of the variable transformer 34 is connected to a suitable source of alternating current, such as to the local main lines. The transformer 34 is variable or adjustable, thus enabling regulation of the power supplied according to the melting and conductive characteristics of the molten glass (which are selected by its batch composition). More power may be applied at the outset of start-up and less applied as the temperature of the glass in the channel heated by means of the channel electrode 32 rises.

It is noted that the connection of the transformer leads to the furnace electrodes is schematically depicted in the drawings; when tin oxide electrodes are used, the electrode connector apparatus shown in U.S. Pat. No. 3,681,506 may be employed. It will be appreciated by those skilled in the art that other suitable means for supplying voltage across the furnace and channel electrodes may be devised. For example, stepless transformers, reactors, silicon controlled rectifiers, and inductrols may also be used in regulating the supply of electrical energy through the electrodes.

This application of power across the furnace electrode 28 and the channel electrode 32 establishes a circuit, represented by current paths or flux C, from the furnace electrode of tier III through the glass bath 26 to at least the conduit inlet end 12b; thereafter through the wall of the conduit 12 to the vicinity of its exit end 12a in the connector channel; and finally from the exit end 12a through the contiguous glass materials in the channel passageway 18 to the connector electrode 32.

It will be appreciated that for conduction and hence Joule effect heating to occur in the connector between the electrode and the conduit, the glass therein must be in a conductive solid or molten state, that is, at a temperature permitting electrical conduction. To achieve this condition, the connector channel assembly 16 may have heating elements incorporated therein for initially heating the batch materials initially within the channel passageway 18 to a conductive temperature and also several electrodes, including electrode 33, in the passageway 18 of the connector to provide Joule heating of the glass in the channel. Once the glass within the channel adjacent to the connector electrode 32 is conductive, such material between the connector electrode and the conduit exits 12a is further heated by the aforedescribed currents C. It is important to note that electrode 32 and electrode 33 may be connected to a power source separate from transformer 34 in order to provide energy to heat the material in the channel passageway 18.

The heated glass at the exit end 12a of the conduit will then radiate or emit heat into the material at the end of the conduit and thereafter within the conduit, as represented by radiation, R. As the temperature of the glass heated by currents C increases, the resistance to electrical currents decreases; and thus, the glass there at will become hotter and radiate more heat. Some of the radiated heat will be absorbed by the conduit, conducted through the conduit, and will be conducted to the material 30 and radiated to the material 30, as shown by the short arrow, R. In this manner, eventually at least the outer or circumferential surface of the cold plug 30 of material will melt. Due to the hydrostatic pressure established by the molten glass in the furnace 10, the partially melted plug 30 will be forced from the conduit 12 and into the connector passageway 18. After the cold material has entered the passageway, it will completely melt under the influence of the connector heating or it may simply pass through the system into downstream glass.

A flange has been used in the past in combination with a metal outlet conduit to prevent glass from passing between the conduit and the sidewall block 22a and entering the connector through leak paths around the conduit, and also to secure the conduit within the furnace. The flange has a sufficiently large diameter to ensure that glass seeping around the conduit from the furnace and channel will set up along the sides of the flange due to natural convective cooling of the flange.

Preferably, the conduit 12 of the present invention is made from molybdenum and includes a molybdenum flange 50 secured thereto between the sidewall block 22a and an entrance block 16a of the connector to establish a seal of molten glass between interfaces of the flange, the connector and the furnace. As is generally known, molybdenum will become oxidized and disappear when exposed at high temperatures to air, for example, at temperatures above 500° C. Accordingly, an important feature of an outlet system using a molybdenum conduit is a means for protecting the molybdenum of the conduit and flange from the atmosphere or ambience.

Figure 2:
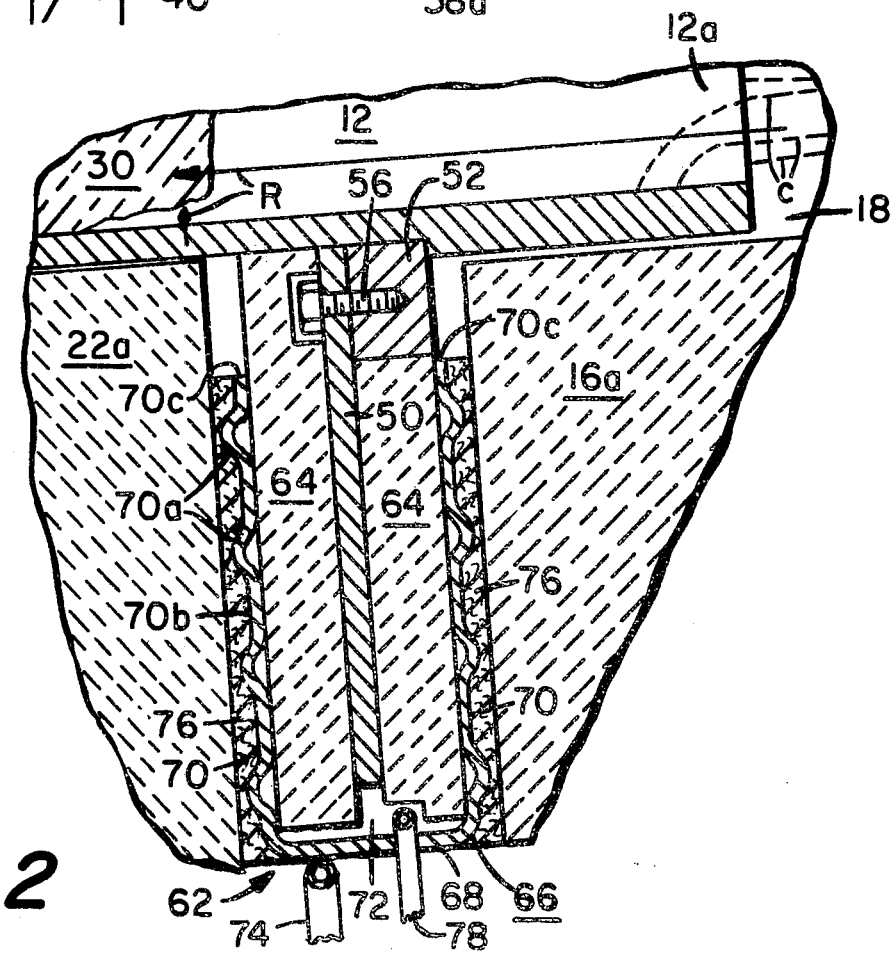
FIG. 2 is an enlarged fragmental sectional illustration of the flange protection assembly shown in FIG. 1.

Referring now to FIG. 2, the flange 50 has a flat-sided annular or washer-like shape and is preferably secured to the conduit 12 by a molybdenum ring 52; that is, the flange 50 has the configuration of a washer. The ring 52 is secured to the conduit 12 by a threaded pin or other suitable fastening means; and the flange 50 is fastened to the ring 52 by a suitable fastener, such as a bolt 56. The pin and bolt 56 are also made of molybdenum. The conduit may have a first diameter portion extending into the furnace sidewall and a second larger diameter portion extending into the entrance block 16a of the connector channel 16. The ring 52 has an inner diameter smaller than that of the second larger diameter portion of the conduit but slightly larger than that of the first smaller diameter portion of the conduit.

The molybdenum flange is protected from oxidation by an assembly 62 including two composite refractory washer-like members 64 abutting the sides of the flange 50 and adjacent portions of the conduit, and an annular collar or shell 66 which has a generally U-shaped configuration in a cross-sectional plane containing the axis of the conduit 12 and which partially envelopes the washer-like refractory members 64. The shell 66 has a preferably cylindrical outer or circumferential portion 68 which is exposed to the ambience, and generally flat side portions 70 depending radially inwardly a selected distance from the axially outer extents of the circumferential portion 68 to inner edges 70c. A cooling pipe 74 is attached to and wrapped around the circumferential portion 68. Also, layers of insulation 76 are interposed between the refractory block 22a of the furnace sidewall 22 and the shell side portion 70 and between the refractory entrance block 16a of the connector assembly 16 and the other shell side 70.

Each of the refractory washer-like members 64 is preferably made from contoured pieces of dense, sintered zircon blocks and has an outer diameter larger than that of the flange 50 to provide an annular space 72 between the flange circumference and the shell 66. The axially extending circumferential portion 68 of the shell is thus separated from the molybdenum flange 50 by the annular space 72. This in necessary when the shell is made from platinum or a platinum alloy and the flange is fabricated from molybdenum, because contact between such metals at high temperatures will cause embrittlement of the platinum by molybdenum oxides. If steel is used to form the shell, it would also have to be separated from a molybdenum flange; because, at high temperatures, steel and molybdenum will form low-melting-point alloys, which can create perforations in the flange, thereby causing mechanical failures and also blister sources (which would lead to glass imperfections and rejections).

The shell or collar 66 preferably has concentric circular ribs 70a formed on its radially extending sides 70, the ribs 70a bowing away from the refractory members 64. The ribs will compress as the metal of the sides 70 expands at high operating temperatures to maintain the initial contacting orientation of the refractory members 64 and the intervening flat portions 70b of the shell sides. The inner edges of the shell side portions 70 have circular configurations with diameters greater than that of the proximal surfaces of the conduit 12, thus preventing contact of the shell and conduit and therefore the aforementioned embrittlement or alloying problems.

The cooling pipe 74 is wrapped around the shell and is affixed, such as by welding, to the exposed cylindrical outer portion 68 of the shell and is supplied with a stream of a fluid cooling medium, such as compressed air. This cooling device removes heat from the shell 66 and the washer-like members 64, whereby molten glass seeping between the shell 66 and refractory blocks 22a and 16a, between the shell 66 and the outer surfaces of the members 64, between the inner surfaces of the members 64 and the sides of the flange 50, and through cracks or interstices in the members 64 (when members 64 are of composite form) will solidify or set up and form glass-tight seals in such locations.

The insulating layers 76 between the metal shell and the refractory blocks 22a and 16a of the furnace and channel are preferably made of a woven refractory cloth, for example, Fiberfrax brand alumina-silica cloth. This cloth is soluble in molten glass, with the solution thereof occuring without evolution of gas and hence the formation of blisters. The refractory cloth layers 76 prevent the metal shell 66 from bonding to the refractory material of the furnace sidewall 22 and the connector entrance block, thereby facilitating disassembly of the outlet system. It also helps to exclude air during heat-up before glass has seeped out to prevent its entrance.

The annular space 72 formed between the refractory discs 64 and other voids in the assembly enclosed by shell 70 are preferably purged of oxygen-containing gases before and during the initial operation or start-up of the glass melting furnace while temperatures in the flange region are greater than about 500° C. A purge pipe 78 is inserted through the shell into the space 72 in a fluid-tight seal therewith. An oxygen-free purge gas such as a non-absorbent nitrogen-hydrogen mixture is forced in through the pipe 78, and the air entrapped in the space is vented out at inner edges of shell 70 and through another tube at the top of the assembly 62, which is not illustrated. After molten glass has entered between the flange assembly parts as described above, the entrapped purge gas may be vented out of the top tube before it and tube 78 are sealed off via valves which are not illustrated.

Cooling medium is now pumped through tube 74. This insures that corrosion of parts in the outer part of the assembly will be minimal with no glass leaks and that no glass can seep or flow around the flange 50. Under correct conditions while glass around the outer edge of flange 50 and shell 70 is frozen, glass at the inner edges of shell 70 is molten or below the annealing temperature to insure exclusion of air from the flange and adjacent portions of the conduit during operations.

In view of the foregoing detailed description of a preferred embodiment of the apparatus of the invention, it will be appreciated that the present invention will yield many advantages over the prior art outlet systems. The primary advantage is that any existing furnace electrode and/or the start-up or lowermost electrodes of an electric furnace may be employed in conjunction with a connector electrode to heat the cold batch or glass in the outlet; this eliminates the multiple electric resistance heating elements of the prior furnaces, and thus the very high cost and difficulty of construction associated with such elements. An ancillary advantage is that the furnace and channel electrodes need not be specially installed. Also, if the installed electrodes deteriorate during operations, other intact electrodes already in the furnace or channel may be employed by a relativey simple modification of the start-up circuit connections. Alternatively, when the furnace is shut down, new electrodes may be installed without completely disassembling the parts of the outlet system. It has also been found that the present system operates more rapidly in melting the cold material in the conduit than the prior furnaces, and thus accelerates the start-up process. Moreover, according to one important feature of this invention, molybdenum may be used for the outlet pipe material rather than platinum or platinum alloys; the flange protection assembly permits the use of this less expensive material without concern for its oxidation and consequent disappearance of the material which would lead to catastrophic failures.

Although the apparatus has been described in connection with an outlet conduit made of molybdenum, the conduit may be made of any other electrically conductive refractory material. When platinum, for example, is employed, the flange protection assembly described in connection with the molybdenum conduit and flange is not needed because platinum parts may be exposed to the atmosphere without deleterious effects thereon.

The present invention may be advantageously applied in combination with furnaces having several delivery or outlet conduits or passageways. That is, when it is desired to supply molten thermoplastic material from a furnace to more than one forehearth or position, several outlet systems including several conductive metal delivery conduits, electrodes, and electrical supply means of the present invention may be employed. Manifestly, great savings in construction costs are obtainable by using the same furnace electrode or electrodes in conjunction with an electrode or electrodes in the several channel means fed by the delivery conduits; and further savings may be realized by utilizing a single electrical supply means (such as a transformer having multiple secondaries) to simultaneously generate the necessary voltages and hence current paths between the furnace electrode or electrodes and the several channel electrodes.

Inasmuch as the foregoing description has been provided solely as that of the preferred embodiment of the invention, the scope of the invention is not to be limited thereby, but is intended to be limited only by the scope of the appended claims. It will be understood that the term, "plug of thermosplastic material", as used in the claims, refers generally to the batch material or solidified pre-molten material in the outlet conduit which forms an obstruction to flow of molten material through the conduit from the furnace to the channel means.

I claim:

1. An improved electric furnace for melting and refining glass, including a chamber for containing a bath of molten glass having a bottom wall and an upstanding peripheral wall; electrode means for supplying electrical energy to said bath; and passageway means extending through said sidewall for delivering molten glass from said bath to channel means for receiving glass, wherein the improvement comprises:
    said passageway means includes a conduit made from an electrically conductive refractory metal;
    said channel means includes electrode means; and
    means for selectively supplying voltage across at least one electrode of said furnace electrode means and said electrode means in said channel means to establish a flow of electrical currents from said at least one furnace electrode to said conduit, through said electrically conductive conduit, and to said electrode means of the channel means,
    whereby said current flow in said channel means heats the glass therein, and heat transferred therefrom at least partially melts glass-forming materials initially within said conduit.

2. The improved electric furnace of claim 1 wherein said conduit is made from molybdenum.

3. The improved electric furnace of claim 2 further including a flange member which is also made from molybdenum and which is secured to said conduit at a position between said furnace sidewall and said channel means, the flange having a flat-sided annular shape of a selected outer diameter; and means for protecting the flange and conduit from oxidation comprising:
    two refractory washer-like members, with one being adjacent one side of the flange, and the other being adjacent the other side of the flange, and both having outer diameters greater than the diameter of the flange;
    an annular metal collar which partially envelopes said washer-like refractory members, said collar having a circumferential portion and side portions extending radially inwardly from said circumferential portion, with the innermost edges of the side portions of said collar being spaced apart from said conduit; and
    means for removing heat from said collar to thereby cool and solidify thermoplastic material which may initially flow between said collar and said washer-like refractory members, and said washer-like members and said flange.

4. In combination with furnace means for melting thermoplastic material, at least one outlet system for delivering molten thermoplastic material from said furnace means into channel means for receiving molten material from the furnace means comprising:
    an electrically conductive refractory conduit having an inlet end positioned within a lower portion of furnace means for melting thermoplastic material and an exit end positioned in channel means adjacent the furnace means for receiving molten thermoplastic material from the furnace means;
    first electrode means within the furnace means;
    second electrode means in the channel means;
    the first and second electrode means respectively positioned relative to the inlet and exit ends of the conduit to establish electric current paths from the first electrode means through thermoplastic material in the furnace means to the inlet end of said conduit, through the electrically conductive conduit to the exit end thereof, and from the exit end through thermoplastic material in the channel means to the second electrode means; and
    means for supplying electrical current to the first and second electrode means to provide current along said paths, thereby electrically heating thermoplastic material in the channel means between the second electrode means and the conduit exit end,
    whereby thermoplastic material initially in the conduit will be at least partially melted by heat transferred from the heated thermoplastic material in the channel means.

5. The outlet system of claim 4 wherein said first electrode means comprises at least one electrode of a plurality of electrodes situated in said furnace means, with the plurality of electrodes being connected to second means for selectively supplying electrical energy to heat thermoplastic material in said furnace means.

6. The outlet system of claim 4 wherein the conduit is made from molybdenum.

7. The outlet system of claim 6 further including a flange member which is also made of molybdenum and is secured to the conduit at a position between said furnace means and said channel means, the flange having a flat-sided washer-like shape of a selected outer diameter; and means for protecting the flange and conduit from oxidation comprising:
    two refractory washer-like members, with one being adjacent one side of the flange and the other being adjacent the other side of the flange, and both having outer diameters greater than the diameter of the flange;
    an annular metal collar which partially envelopes said washer-like refractory members, said collar having a circumferential portion and side portions extending radially inwardly from said circumferential portion, with the innermost edges of the side portions of said collar being spaced apart from said conduit; and
    means for removing heat from said collar to thereby cool and solidify thermoplastic material which may initially flow between said collar and said washer-like refractory members, and said washer-like members and said flange.

8. The outlet system of claim 7 further including a layer of refractory material between a side portion of said collar and said furnace means, and another layer of refractory material between the other side portion of said collar and said channel means.

9. The outlet system of claim 7 further including means for purging oxygen-containing gases from within said means for protecting the flange and conduit from oxidation.

10. Apparatus for heating glass-forming material within a delivery conduit of a glass melting furnace comprising:
   a delivery conduit extending laterally through a vertical wall of a glass melting furnace into a channel for receiving glass melted within said furnace, said conduit having an inlet end in said furnace and an exit end in said channel;
   said delivery conduit being made from an electrically conductive refractory metal;
   at least one electrode in said furnace;
   at least one electrode in said channel;
   means connected to said electrodes in said furnace and said channel for establishing the flow of electrical currents between said at least one furnace electrode and said conduit inlet end, through said electrically conductive conduit, and between said exit end of said conduit and said at least one channel electrode,
   whereby said currents between said at least one furnace electrode and said exit end of said conduit heat the glass-forming materials thereat, and radiated heat from said heated material at least partially melts glass-forming material within said conduit.

11. The apparatus of claim 10 wherein said furnace includes other electrodes, and said at least one electrode in said furnace is also connected to a second means for selectively establishing the flow of electrical currents through glass-forming materials between said at least one electrode and said other electrodes in said furnace.

12. The apparatus of claim 10 wherein said conduit is made from molybdenum.

13. The apparatus of claim 12 further including an annular flange member which is also made from molybdenum and which is positioned to said conduit between said furnace and said channel, the flange being protected from exposure to the ambience by an assembly comprising:
   two refractory washer-like members, with one being adjacent one side of the flange and the other being adjacent the other side of the flange, and both having outer diameters greater than the diameter of the flange;
   an annular metal collar which partially envelopes said washer-like refractory members, said collar having a circumferential portion and side portions extending radially inwardly from said circumferential portion, with the innermost edges of the side portions of said collar being spaced apart from said conduit; and
   means for removing heat from said collar to thereby cool and solidify thermoplastic material which may initially flow between said collar and said washer-like refractory members, and said washer-like members and said flange.

* * * * *